Sept. 15, 1936.  C. G. EISENBERG, JR  2,054,122
CONVERTIBLE TRUCK BODY
Filed Aug. 14, 1935  2 Sheets-Sheet 1
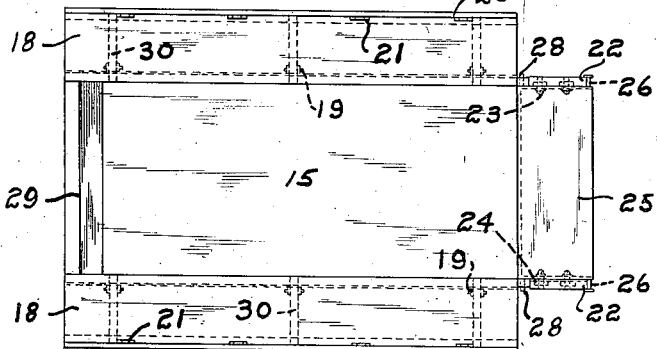
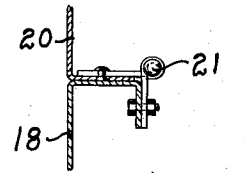
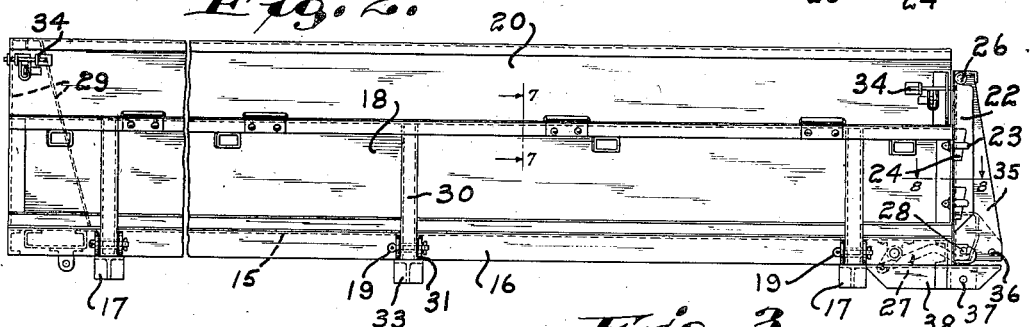
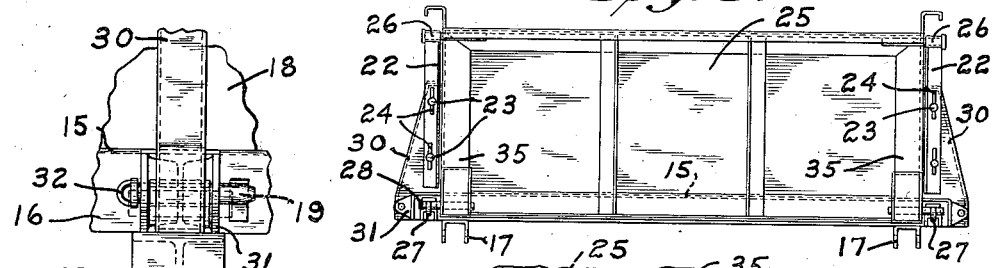
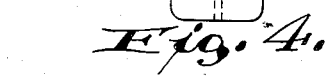
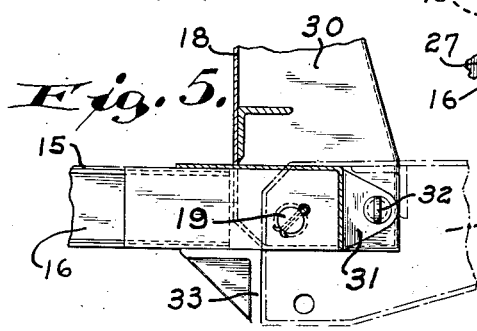
INVENTOR.
C. G. Eisenberg, Jr.
BY Morsell, Lieber & Morsell
ATTORNEYS.

Sept. 15, 1936.   C. G. EISENBERG, JR   2,054,122
CONVERTIBLE TRUCK BODY
Filed Aug. 14, 1935   2 Sheets-Sheet 2
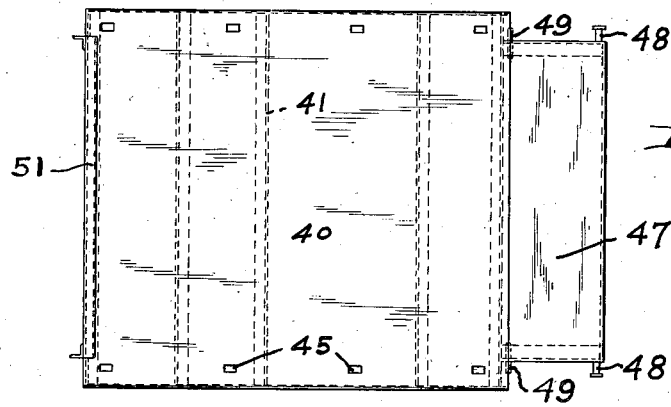
Fig. 9.
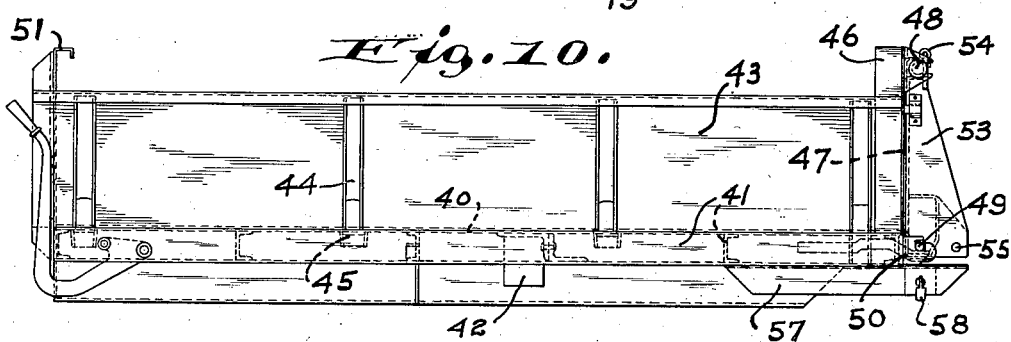
Fig. 10.
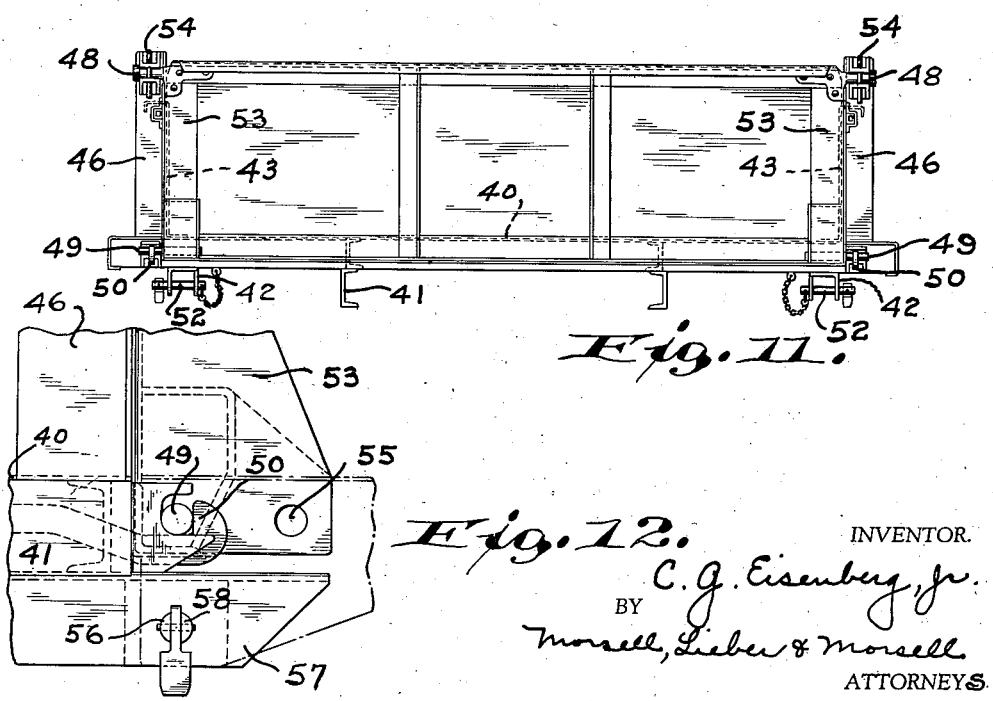
Fig. 11.
Fig. 12.
INVENTOR.
C. G. Eisenberg, Jr.
BY
Morsell, Lieber & Morsell
ATTORNEYS.

Patented Sept. 15, 1936

2,054,122

UNITED STATES PATENT OFFICE 2,054,122

CONVERTIBLE TRUCK BODY

Charles G. Eisenberg, Jr., Wauwatosa, Wis., assignor to The Heil Co., Milwaukee, Wis., a corporation of Wisconsin Application August 14, 1935, Serial No. 36,069

3 Claims. (Cl. 296—10)

The present invention relates in general to improvements in the art of transportation, and relates more specifically to an improved truck body which is convertible from a receptacle type to a flat type, and vice versa.

Generally defined, an object of the invention is to provide an improved convertible truck body which is simple and durable in construction, and which is moreover highly effective in use.

It has heretofore been proposed to provide a truck body adapted to be converted from a receptacle to a flat type, and vice versa, wherein the bottom of the body was provided with rear corner posts which served the dual purpose of holding the side walls in normal upright position, and also of providing a pivotal support for the upper portion of an end gate, when the body side walls were in normal position. The side walls of this prior structure could be bodily removed from the bottom, and when the side walls were thus removed, the rear corner posts could be swung rearwardly to bring the end gate substantially into the plane of the body bottom. The corner posts utilized to support the side walls and end gate in the prior device, were relatively bulky and cumbersome thus making it rather difficult to convert the body from one type to another, and the prior assemblage was also relatively costly and complicated.

It is therefore a more specific object of the present invention to provide a relatively light and compact convertible truck body assemblage which possesses all of the advantages of the prior devices of this character, and which is more conveniently convertible, and which may be manufactured at moderate cost.

Another specific object of the invention is to provide a convertible body structure wherein the use of corner posts associated with the rear of the bottom, is entirely avoided, and in which the end gate is normally pivotally suspended directly from the body side walls.

A further specific object of the invention is to provide a new and useful dual-purpose truck body, which is adapted for interchangeable use either as a rear end dumping receptacle, or as a flat carrier platform, and which can be readily converted from one use to another.

Still another specific object of the invention is to provide an improved carrier body of extremely durable construction which can be manufactured of standard metal plate and bar stock, and which presents a neat and highly finished appearance.

These and other objects and advantages will be apparent from the following detailed description.

A clear conception of several embodiments of the invention, and of the mode of constructing, converting, and of utilizing truck bodies built in accordance with the improvement, may be had by referring to the drawings accompanying and forming a part of this specification wherein like reference characters designate the same or similar parts in the various views.

Fig. 1 is a somewhat diagrammatic plan view of one type of convertible truck body having the opposite side walls hingedly attached to the bottom, and having an end gate which is interchangeably suspendable either from the side walls or from the bottom;

Fig. 2 is an enlarged fragmentary side view of the body of Fig. 1, showing the side walls elevated and the end gate swingably suspended at its upper end from the side walls;

Fig. 3 is an end elevation of the body assembled as in Fig. 2;

Fig. 4 is a further enlarged side view of a fragment of one of the side wall supports and hinges;

Fig. 5 is a similarly enlarged fragmentary sectional view of the side wall support and hinge, showing the same swung into horizontal position in dot-and-dash lines;

Fig. 6 is a likewise enlarged fragmentary side elevation of the lower rear portion of the truck body, showing the end gate swung into horizontal position, in dot-and-dash lines;

Fig. 7 is an enlarged fragmentary transverse vertical section through one of the side walls, the section being taken along the line 7—7 of Fig. 2;

Fig. 8 is an enlarged fragmentary horizontal section through a rear corner of the body, taken along the line 8—8 of Fig. 2;

Fig. 9 is a diagrammatic plan view of another type of convertible truck body having the opposite walls bodily removable from the bottom, and an end gate which is interchangeably swingable either from the side walls or from the rear end of the bottom;

Fig. 10 is a somewhat enlarged side elevation of the body of Fig. 9, with the side walls and end gate assembled upon the bottom to form a receptacle;

Fig. 11 is an end view of the modified truck body, showing the same assembled as in Fig. 10; and Fig. 12 is a further enlarged side elevation of a fragment of the lower rear portion of the modified body, showing the end gate swung into horizontal position, in dot-and-dash lines.

While the improvement has been shown herein as being specifically applied to truck bodies of the rear end discharge type especially adapted for motor truck transportation, it is not intended to unnecessarily restrict the scope by virtue of such specific embodiment.

Referring to Figs. 1 to 7 inclusive of the drawings, the improved convertible truck body shown therein, comprises in general, a flat substantially horizontal bottom 15 having lower reenforcing beams 16 and cleats 17; opposite side walls having lower sections 18 swingably attached to the bottom 15 by means of pivot pins 19, and also having upper sections 20 hingedly attached to the sections 18 by hinges 21; angle irons 22 normally attached to the ends of the lower side wall sections 18 by removable pins 23 and wedges 24; an end gate 25 normally pivotally suspended at its upper ends from the angle irons 22 by pivots 26; and hook means 27 cooperable with pins 28 at the lower end of the gate 25 to normally hold the gate in closed position.

The bottom 15 may be formed of sheet metal, and may be provided with a front upstanding end wall 29 rigidly attached thereto, and the beams 16 and cleats 17 may be caused to cooperate with the chassis beams of a truck in a well known manner. The body is ordinarily freely removable from the truck, and in some instances the truck is provided with mechanism for tilting the body bottom 15 to an inclined position for the purpose of discharging the body contents past the end gate 25 when the hook means 27 are released. The reenforcing beams 16 may be of any desired number, and are ordinarily formed of standard bar stock; and these beams may be riveted or welded to the bottom plate.

The sections 18, 20 of the composite side walls, may also be formed of sheet metal, and the lower sections 18 are preferably reenforced by struts 30 with which the pivot pins 19 are directly cooperable. These struts 30 are also provided with openings which are registerable with alinable openings in ears 31 formed integral with the bottom 15, and when these sets of openings are in alinement, locking pins 32 may be inserted therein as shown in Figs. 4 and 5, so as to lock the side wall sections 18 in normal elevated position. By removing the locking pins 32, the side walls may be swung about the pivot pins 19 into horizontal alinement with the bottom 15 as shown in dot-and-dash lines in Fig. 5, and the lower ends of the struts 30 then engage stops 33 secured to the bottom beams 16. By removing both sets of pins 19, 32, the side walls may be entirely or bodily removed from the bottom structure. The upper side wall sections 20 merely serve to increase the depth of the assembled body, and may be swung outwardly about the hinges 21 upon release of the latches 34. When the side walls are swung into horizontal position as in Fig. 1 and in dot-and-dash lines in Fig. 5, the upper sections 20 will drop into vertical position depending from the outer edges of the lower sections 18.

The angle irons 22 which are normally attached to the rear ends of the lower side wall sections 18 by means of the pins 23 and wedges 24, extend upwardly beyond the top edges of the sections 18 and coact with the rear latches 34. Normally, the pivots 26 are journaled in the upper ends of the angle irons 22 and the latter are firmly attached to the side walls, but the wedges 24 may be removed from the pins 23 and these pins may then be withdrawn to release the normal connection. Then by inserting the pins 23 in alined holes in the end gate reenforcement 35 and reapplying the wedges 24 as illustrated in dot-and-dash lines in Fig. 8, the angle irons 22 may be secured to the end gate 25 so as to permit the gate to be swung into horizontal position about the hook means 27 and pins 28. The end gate 25 may also be formed of sheet metal suitably strengthened by the reenforcements 35, and the hook means 27 which normally merely serve to hold the gate 25 in closed position, may be manipulated in a well known manner from any suitable point of control such as the driver's cab of the vehicle. Because of the fact that such hook manipulating devices are old and well known, it has been deemed unnecessary to complicate the disclosure by making a detailed showing thereof. When the end gate 25 has been swung to horizontal position as shown in Fig. 1 and in dot-and-dash lines in Fig. 6, locking pins 32' similar to the pins 32, may be inserted in alined holes 36, 37 in the end gate 25 and in the bottom member 38, in order to prevent undesirable displacement of the end gate relative to the bottom 15.

During normal use of the improved convertible truck body shown in Figs. 1 to 8 inclusive, for the transportation of material in bulk, the structure is assembled as shown in solid lines in Figs. 2 to 8, with the side walls extending upwardly from the bottom 15, the angle irons 22 secured to the lower side wall sections 18, and the end gate 25 pivotally suspended from the upper ends of the upstanding angle irons 22. The body assemblage may then be transported horizontally to carry a load, or it may be tilted and the hook means 27 may be released to effect outward swinging of the end gate 25 thus permitting end dumping of the load from the bottom 15 past the end gate. If it becomes desirable to transport elongated objects of greater length than the assembled body, the angle irons 22 may be removed from the ends of the lower side wall sections 18 and attached to the end gate reenforcements 35 as illustrated in Fig. 1 and in dot-and-dash lines in Fig. 8, whereupon the side wall sections 18 and the end gate 25 may be swung into the plane of the bottom 15 thus providing a flat transporting deck of considerable area. The upper side wall sections 20 will then hang vertically from the outer ends of the sections 18, and the pins 32, 32' may be utilized to lock the side walls and end gate in flatwise condition. During such conversion, the side wall sections 18 and the end gate 25 swing about the pins 19, 28 respectively; and the reassemblage of the structure into receptacle form can obviously be just as readily effected by merely swinging the side walls and end gate upwardly and reattaching the angle irons 22 to the wall sections 18.

Referring to Figs. 9 to 12 inclusive of the drawings, the modified improved convertible truck body shown therein, comprises in general, a substantially flat horizontal bottom 40 having lower reenforcing beams 41 and cleats 42; opposite side walls 43 having reenforcing struts 44, the lower projecting ends of which are insertible within openings 45 to removably attach the walls 43 to the bottom 40; end brackets 46 rigidly attached to the rear ends of the side walls 43 and projecting upwardly therefrom; an end gate 47 having upper pivot pins 48 adapted to be detachably journaled in the upper ends of the brackets 46, and also having lower pins 49 projecting therefrom; hook means 50 cooperable with the pins 49 to hold the gate 47 in closed position; and a front end wall 51 permanently attached to the foremost portion of the bottom 40 and projecting upwardly therefrom.

The modified body portion 40 may likewise be formed of sheet metal, and the cleats 42 may be attached to the chassis beams of a vehicle by means of pins 52; and the assembled body may thus be conveniently applied to or removed from the vehicle. In most cases, the vehicle is provided with a tiltable sub-frame upon which the body is mounted for tilting to an inclination sufficient to effect end dumping of the contents past the end gate 47. The reenforcing beams 41 may be formed of standard channel bar stock and may be rigidly secured to the bottom 40 by riveting, welding, or otherwise.

The removable side walls 43 may also be formed of sheet metal, and in some cases the lower ends of the struts 44 may be hingedly attached to the bottom 40 as in the other embodiment of the invention disclosed herein. The end gate 47 which is likewise formed of sheet metal, has end reenforcements 53 to which the pivot pins 48 are firmly attached, and the pins 48 are normally held within the upper sockets of the brackets 46 by removable cotter pins 54. The hook means 50 are operable from the front of the body, in a well known manner, so that when these hook means are released, the end gate 47 may swing about the pivot pins 48; whereas when the hook means engage the lower pins 49, the end gate is either locked in closed position, or it may be swung to horizontal position about the pins 49 upon removal of the cotter pins 54. The end gate reenforcements 53 are provided with holes 55 which are alinable with holes 56 in a lower angle iron 57 attached to the bottom 40; and a pin 58 is insertable within these holes 55, 56 when they are alined, in order to lock the end gate 47 in horizontal position.

During normal use of the modified improved convertible truck body shown in Figs. 9 to 12 inclusive, for the transportation of material in bulk, the structure is assembled as shown in Figs. 10 and 11, with the lower ends of the struts 44 of the side walls 43 inserted within the holes 45 of the bottom 40, and the end gate 47 is pivotally suspended in the sockets at the upper ends of the brackets 46. The body assemblage may then be transported horizontally in order to carry a load, or it may be tilted, and the hook means 50 may be released to effect outward swinging of the end gate, thus permitting end dumping of the load from the bottom 40 past the end gate 47. Should it become desirable to transport elongated objects, the side walls 43 may be removed from the bottom 40 upon withdrawal of the cotter pins 54, and the end gate 47 may then be swung into horizontal position in substantial alinement with the bottom 40 as shown in Fig. 9, and the pins 58 shown in Fig. 12 may be applied to the alined holes 55, 56 to lock the end gate in this position, as shown in dot-and-dash lines in Fig. 12. The reconversion of the flat body into a receptacle may obviously be effected just as easily as the conversion from receptacle form into flat form.

From the foregoing description it will be apparent that the present improvement provides a convertible body structure which is simple, compact, and durable in construction, and which may be readily transformed from one form to another. The end bracket 46 or the equivalent angle irons 22 may be rigidly affixed to the ends of the side walls, thereby dispensing with the use of corner posts associated with the bottom of the body, and in the form of the invention shown in Figs. 1 to 8 inclusive, these brackets may be attached either to the side walls or to the end gate. In either of the embodiments shown, the side walls may be hingedly attached to the opposite sides of the bottom, and when the body is of relatively great width as in Fig. 9, it may be desirable to entirely remove the side walls because of necessary road clearances. The improved structure may obviously be manufactured and sold at moderate cost, and both forms of the improvement have proven highly successful in actual commercial use.

It should be understood that it is not desired to limit the present invention to the exact details of construction herein shown and described as various modifications within the scope of the claims may occur to persons skilled in the art.

I claim:—

1. A truck body, comprising, a bottom, side walls pivotally attached to the opposite edges of said bottom and swingable from substantially upright position to positions of substantial alinement with said bottom, a bracket detachably attached to the rear end of each of said side walls, an end gate interchangeably swingably attachable either to the upper end portions of said brackets or to the rear portion of said bottom, common means for effecting interchangeable attachment of said brackets either to said side walls or to the adjacent ends of said end gate, and means for positively locking said end gate in position when said gate is swung about said rear bottom portion.

2. A truck body, comprising, a bottom, side walls hingedly attached to the opposite edges of said bottom and swingable downwardly into substantial alinement with the bottom, a bracket detachably attached to the rear end of each of said side walls, an end gate interchangeably swingably attachable either to the upper end portions of said brackets or to the rear portion of said bottom, and common means for effecting interchangeable attachment of said brackets either to said side walls or to the adjacent ends of said end gate.

3. A truck body, comprising, a bottom, side walls swingably attached to the opposite edges of said bottom, each of said side walls having an outwardly projecting end flange, an angular bracket detachably attachable to each of said flanges, an end gate adapted for swinging suspension from the upper ends of said brackets when the latter are attached to said side wall flanges, said end gate being disconnectible from said brackets and swingably suspendable from the rear portion of said bottom and having rearwardly projecting flanges disposable near said wall flanges, and common means for effecting interchangeable attachment of said bracket either to said wall flanges or to said end gate flanges.

CHARLES G. EISENBERG, Jr.